United States Patent
Thakur et al.

(10) Patent No.: US 11,811,760 B2
(45) Date of Patent: Nov. 7, 2023

(54) SESSIONLESS VALIDATION OF CLIENT CONNECTIONS WHILE MITIGATING COOKIE HIJACK ATTACKS

(71) Applicant: Citrix Systems, Inc., Fort Lauderdale, FL (US)

(72) Inventors: Ratnesh Singh Thakur, San Jose, CA (US); Raghukrishna Hegde, Milpitas, CA (US)

( * ) Notice: Subject to any disclaimer, the term of this patent is extended or adjusted under 35 U.S.C. 154(b) by 169 days.

(21) Appl. No.: 17/230,334

(22) Filed: Apr. 14, 2021

(65) Prior Publication Data
US 2022/0337587 A1  Oct. 20, 2022

(51) Int. Cl.
G06F 7/04 (2006.01)
H04L 9/40 (2022.01)

(52) U.S. Cl.
CPC ........ H04L 63/0876 (2013.01); H04L 63/083 (2013.01)

(58) Field of Classification Search
CPC .. G06F 21/335; G06F 21/577; G06F 21/6263; H04L 9/0866; H04L 9/0869; H04L 9/3271; H04L 63/14; H04L 63/1441; H04L 63/1466; H04L 63/0876; H04L 63/083
See application file for complete search history.

(56) References Cited

U.S. PATENT DOCUMENTS

| 9,491,157 | B1 * | 11/2016 | Amdahl | H04L 67/1001 |
| 11,375,035 | B2 * | 6/2022 | Tylee | H04L 65/1045 |
| 11,677,846 | B1 * | 6/2023 | Howes | H04L 63/0428 |
| | | | | 709/224 |
| 2001/0021917 | A1 * | 9/2001 | Hatano | G06Q 30/0641 |
| | | | | 705/27.1 |
| 2007/0250923 | A1 | 10/2007 | M'Raihi | |
| 2009/0144806 | A1 * | 6/2009 | Gal | H04L 63/083 |
| | | | | 726/3 |
| 2011/0035784 | A1 * | 2/2011 | Jakobsson | H04L 63/1466 |
| | | | | 726/2 |
| 2014/0304810 | A1 * | 10/2014 | Khanal | H04L 63/1466 |
| | | | | 726/22 |

(Continued)

OTHER PUBLICATIONS

Ayadi et al., HTTP Session Management: Architecture and Cookies Security, May 18, 2001, IEEE, pp. 1-7. (Year: 2001).*

(Continued)

*Primary Examiner* — Philip J Chea
*Assistant Examiner* — Jenise E Jackson

(57) ABSTRACT

Described embodiments provide systems and methods for validating connections while mitigating cookie hijack attacks. A device intermediary between a client and a server can receive a request from the client to establish a connection. The device may send a cookie to the client, the cookie generated according to a connection identifier and a shared counter. The device may receive a response from the client that includes a client validation cookie for validating the request. The client validation cookie may be generated according to the cookie. The device may determine a candidate validation cookie according to a value of a counter range of the shared counter, that matches the client validation cookie. The device may validate the request responsive to the determination.

20 Claims, 8 Drawing Sheets

(56) References Cited

U.S. PATENT DOCUMENTS

| | | | |
|---|---|---|---|
| 2014/0373138 A1* | 12/2014 | Park | H04L 63/1458 726/22 |
| 2015/0082029 A1* | 3/2015 | Volchok | H04L 67/142 713/164 |
| 2017/0264624 A1* | 9/2017 | Wan | H04L 63/1425 |
| 2018/0084008 A1* | 3/2018 | Turuvekere Nataraja | H04L 63/08 |
| 2020/0110871 A1* | 4/2020 | Perlman | G06F 21/645 |
| 2020/0162922 A1* | 5/2020 | Kang | H04W 12/106 |
| 2020/0366695 A1* | 11/2020 | Louw | H04L 63/1433 |
| 2022/0075731 A1* | 3/2022 | Dong | G06F 9/5022 |

OTHER PUBLICATIONS

Kwon et al., (In-) Security of Cookies in HTTPS: Cookie Theft by Removing Cookie Flags, Aug. 29, 2019, pp. 1-12. (Year: 2019).*

Citrix: "Cookie hijacking protection", Dec. 4, 2020 (Dec. 4, 2020), XP055932659, Retrieved from the Internet: URL:https://web.archive.org/web/20201204060502/https:// docs.citrix.c~m/en-us/citrix-adc/current-release/application-firewall/cookie-protection/waf-cookie-hijack-protection.html [retrieved on Jun. 17, 2022].

International Search Report and Written Opinion on PCT Appl. No. PCT/US2022/024344 dated Jul. 1, 2022.

* cited by examiner

SESSIONLESS VALIDATION OF CLIENT CONNECTIONS WHILE MITIGATING COOKIE HIJACK ATTACKS

FIELD OF THE DISCLOSURE

The present application generally relates to protecting resources from unauthorized access, including but not limited to systems and methods for validating a request to establish a connection, while preventing unauthorized access to validation information (e.g., cookies).

BACKGROUND

Certain systems can execute one or more processes to mitigate unauthorized attempts to access validation information. The processes may provide protective mechanisms against said attempts. For example, one or more approaches for mitigating unauthorized attempts include challenging every attempt to establish a connection. At least one problem with said approaches may be a failure to provide protection against unauthorized attempts (e.g., by an attacker) that seek to make a system unavailable to intended users. For instance, a system can maintain an entry for each unverified request to establish the connection. As such, an attacker can send a plurality of unverified requests in an effort to consume/exhaust the memory/storage of the system. By consuming the memory of the system, the attacker can overload the system and prevent other requests (e.g., legitimate requests to establish a connection) from being fulfilled.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for validating a request from a client (e.g., a smartphone, a laptop, a tablet device, a desktop computer of a user, and/or a client supporting HTTP/HTTPS) to establish a connection, while preventing/mitigating attempts (e.g., attempts by an attacker) to hijack/acquire/access validation information (e.g., cookies). Certain systems and/or methods may prevent unauthorized access to validation/authentication information by challenging/validating each request to establish a connection (e.g., a secure connection and/or a non-secure connection). To challenge/validate each request, a device (e.g., a gateway module, a local/foreign node, and/or an application delivery controller (ADC)) intermediary between a client and a server (e.g., a backend server supporting hypertext transfer protocol (HTTP) and/or hypertext transfer protocol secure (HTTPS)) may generate/configure a cookie (or other information) for validating the request. The device may generate/configure/create the cookie according to a connection identifier (e.g., a unique-id) and/or a shared counter (e.g., a global variable counter).

Responsive to generating the cookie, the device may send/transmit/provide/indicate/communicate the cookie to the client. The client can then generate/configure a client validation cookie (e.g., a morphed/modified cookie) according to (or based on) the cookie (e.g., provided by the device) and/or an authentication token for the connection (e.g., a secret token). The authentication token can be generated/configured/determined/provided when a user session is created for a user/entity. Responsive to generating the client validation cookie, the client may send/transmit/communicate the client validation cookie (e.g., send in a response) to the device. To validate the request, to establish the connection, the device may recalculate/generate/configure a candidate validation cookie (e.g., a morphed cookie) using an authentication token for the connection (e.g., a secret token from the user session) and/or a value of a counter range of the shared counter (e.g., a value within a global counter range). If the client validation cookie (e.g., an incoming morphed cookie) matches/corresponds to at least one calculated candidate validation cookie (e.g., calculated using one or more values within the global counter range), the connection can be considered valid.

In one aspect, the present disclosure is directed to a method for validating a request to establish a connection. The method can include receiving, by a device intermediary between a client and a server, a request from the client to establish a connection. The device may send a cookie to the client, the cookie generated according to a connection identifier and a shared counter. The device may receive a response from the client that includes a client validation cookie for validating the request. The client validation cookie may be generated according to the cookie. The device may determine a candidate validation cookie according to a value of a counter range of the shared counter, that matches the client validation cookie. The device may validate the request responsive to the determination.

In some embodiments, the device may generate the connection identifier for the connection according to a plurality of connection parameters. The plurality of connection parameters may comprise at least one of: a secure sockets layer (SSL) session identifier, a shared unique identifier, a client internet protocol (IP) address, a server IP address, a port of the client, a port of the server, or a server sequence number. In some embodiments, the shared counter may output a next value at predetermined time intervals. In certain embodiments, the device may generate a first candidate cookie for a first value of the counter range. The device may generate the first candidate cookie according to the connection identifier and the counter range. The device may generate a first candidate validation cookie according to an authentication token for the connection and the first candidate cookie. The device may determine whether the first candidate validation cookie matches the client validation cookie.

In certain embodiments, the device may determine that the first candidate validation cookie matches the client validation cookie. Responsive to the first candidate validation cookie matching the client validation cookie, the device may incorporate an indication of the connection to a list of validated connections. In some embodiments, the device may determine that the first candidate validation cookie fails to match the client validation cookie. Responsive to the first candidate validation cookie failing to match the client validation cookie, the device may generate a second candidate cookie for a second value of the counter range according to the connection identifier and the counter range. The device may generate a second candidate validation cookie according to the authentication token and the second candidate cookie. The device may determine that the second candidate validation cookie matches the client validation cookie. Responsive to the second candidate validation cookie matching the client validation cookie, the device may incorporate an indication of the connection to a list of validated connections.

In some embodiments, the device may generate a plurality of candidate cookies according to a plurality of values of the counter range. The device may generate the plurality of candidate cookies according to the connection identifier. The device may generate a plurality of candidate validation cookies according to an authentication token and the plurality of candidate cookies. The device may determine whether the plurality of candidate validation cookies includes the candidate validation cookie that matches the client validation cookie. The device may determine that the candidate validation cookie, from the plurality of candidate validation cookies, matches the client validation cookie. In certain embodiments, the counter range of the shared counter may comprise a plurality of values of the shared counter identified according to a sliding window. The device may determine a first candidate cookie using a first function corresponding to a first value of the plurality of values of the shared counter. The device may determine a second candidate cookie using a second function corresponding to a second value of the plurality of values of the shared counter.

In one aspect, the present disclosure is directed to a device for validate a request to establish a connection. The device may comprise at least one processor. The at least one processor may be configured to receive a request from a client to establish a connection. The at least one processor may be configured to send a cookie, the cookie generated according to a connection identifier and a shared counter. The at least one processor may be configured to receive a response from the client that includes a client validation cookie for validating the request. The client validation cookie may be generated according to the cookie. The at least one processor may be configured to determine a candidate validation cookie according to a value of a counter range of the shared counter, that matches the client validation cookie. The at least one processor may be configured to validate the request responsive to the determination.

In some embodiments, the at least one processor may be configured to generate the connection identifier for the connection according to a plurality of connection parameters. The plurality of connection parameters may comprise at least one of: a secure sockets layer (SSL) session identifier, a shared unique identifier, a client internet protocol (IP) address, a server IP address, a port of the client, a port of a server, or a server sequence number. The at least one processor may be configured to generate a first candidate cookie for a first value of the counter range. The at least one processor may be configured to generate the first candidate cookie according to the connection identifier and the counter range. The at least one processor may be configured to generate a first candidate validation cookie according to an authentication token for the connection and the first candidate cookie. The at least one processor may be configured to determine whether the first candidate validation cookie matches the client validation cookie. In certain embodiments, the at least one processor may be configured to determine that the first candidate validation cookie matches the client validation cookie. Responsive to the first candidate validation cookie matching the client validation cookie, the at least one processor may be configured to incorporate an indication of the connection to a list of validated connections.

In certain embodiments, the at least one processor may be configured to determine that the first candidate validation cookie fails to match the client validation cookie. Responsive to the first candidate validation cookie failing to match the client validation cookie, the at least one processor may be configured to generate a second candidate cookie for a second value of the counter range according to the connection identifier and the counter range. The at least one processor may be configured to generate a second candidate validation cookie according to the authentication token and the second candidate cookie. The at least one processor may be configured to determine that the second candidate validation cookie matches the client validation cookie. Responsive to the second candidate validation cookie matching the client validation cookie, the at least one processor may be configured to incorporate an indication of the connection to a list of validated connections.

In some embodiments, the at least one processor may be configured to generate a plurality of candidate cookies according to a plurality of values of the counter range. The at least one processor may be configured to generate the plurality of candidate cookies according to the connection identifier. The at least one processor may be configured to generate a plurality of candidate validation cookies according to an authentication token and the plurality of candidate cookies. The at least one processor may be configured to determine whether the plurality of candidate validation cookies includes the candidate validation cookie that matches the client validation cookie. The at least one processor may be configured to determine that the candidate validation cookie, from the plurality of candidate validation cookies, matches the client validation cookie. In some embodiments, the at least one processor may be configured to determine a first candidate cookie using a first function corresponding to a first value of a plurality of values of the shared counter. The at least one processor may be configured to determine a second candidate cookie using a second function corresponding to a second value of the plurality of values of the shared counter. The counter range of the shared counter may comprise the plurality of values of the shared counter identified according to a sliding window.

In one aspect, the present disclosure is directed to a non-transitory computer readable medium storing program instructions for validating a request to establish a connection. The program instructions stored in a non-transitory computer readable medium may cause at least one processor to receive a request from a client to establish a connection. The at least one processor may reside in a device. The program instructions can cause the at least one processor to send a cookie, the cookie generated according to a connection identifier and a shared counter. The program instructions may cause the at least one processor to receive a response from the client that includes a client validation cookie for validating the request, the client validation cookie generated according to the cookie. The program instructions may cause the at least one processor to determine a candidate validation cookie according to a value of a counter range of the shared counter, that matches the client validation cookie. The program instructions may cause the at least one processor to validate the request responsive to the determination.

In some embodiments, the program instructions may cause the at least one processor to generate a plurality of candidate cookies according to a plurality of values of the counter range. The program instructions may cause the at least one processor to generate the plurality of candidate cookies according to the connection identifier. The program instructions may cause the at least one processor to generate a plurality of candidate validation cookies according to an authentication token and the plurality of candidate cookies. The program instructions may cause the at least one processor to determine whether the plurality of candidate validation cookies includes the candidate validation cookie that matches the client validation cookie.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for validating a request to establish a connection.

A. Network and Computing Environment

Figure 1A:
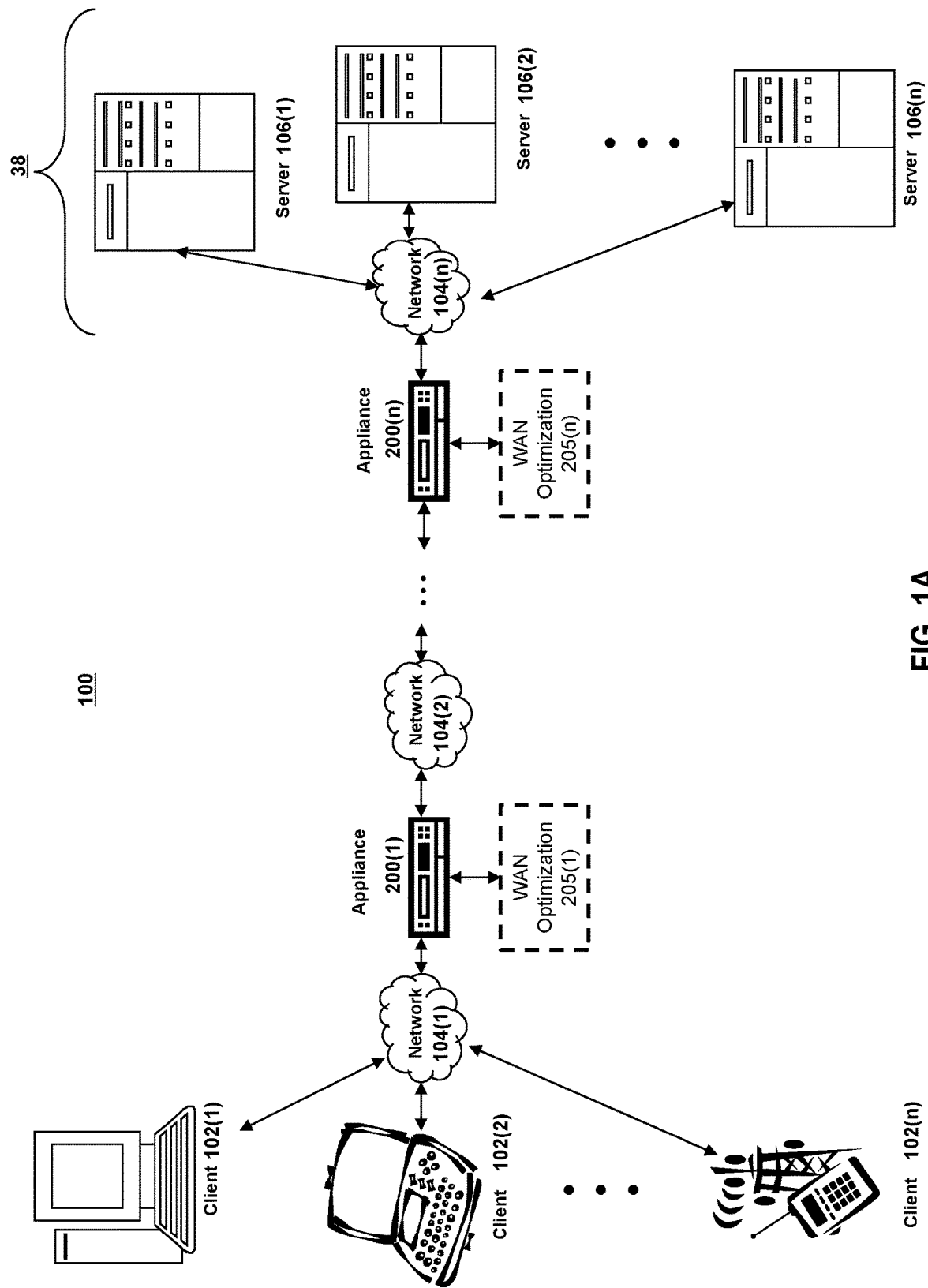
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
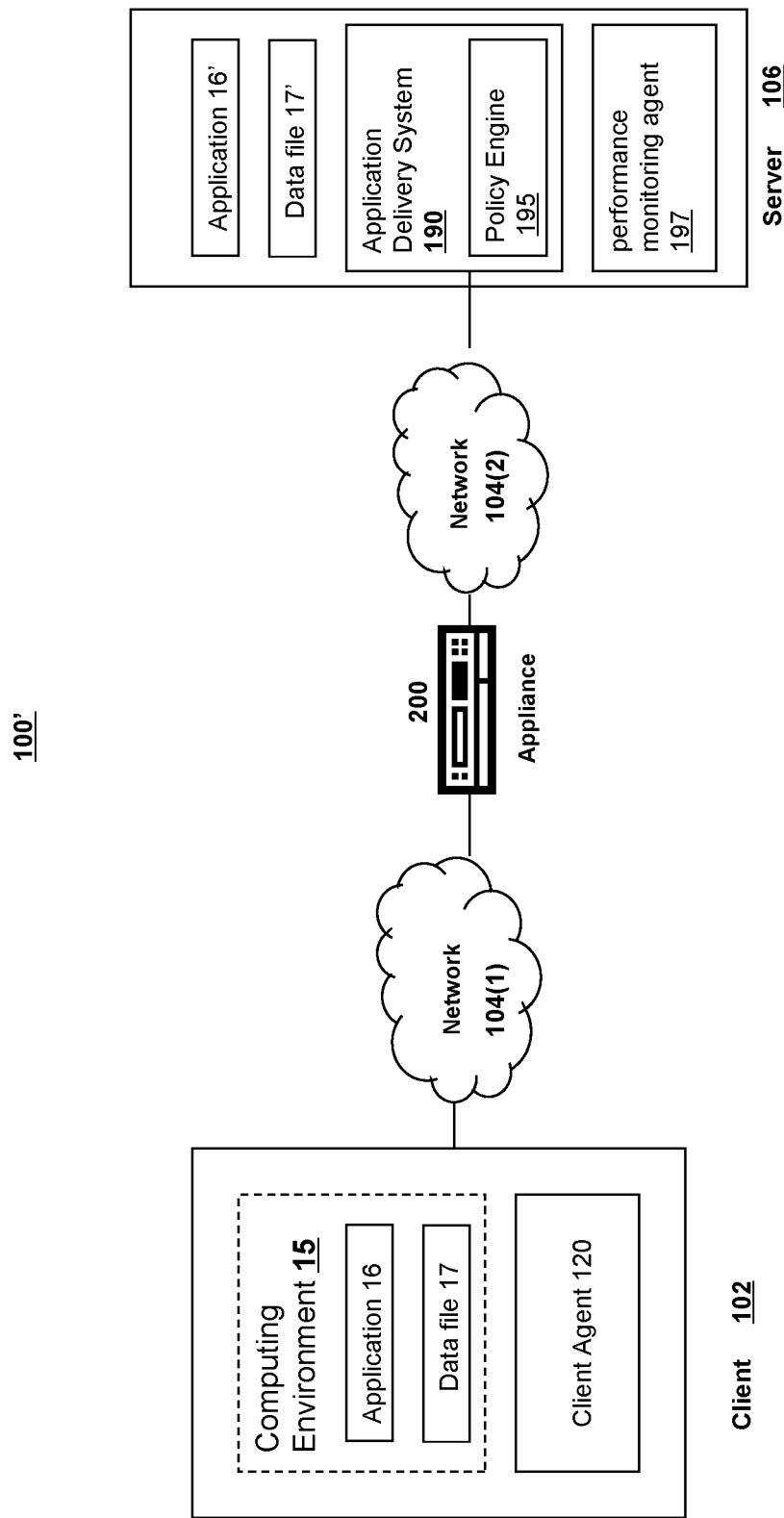
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
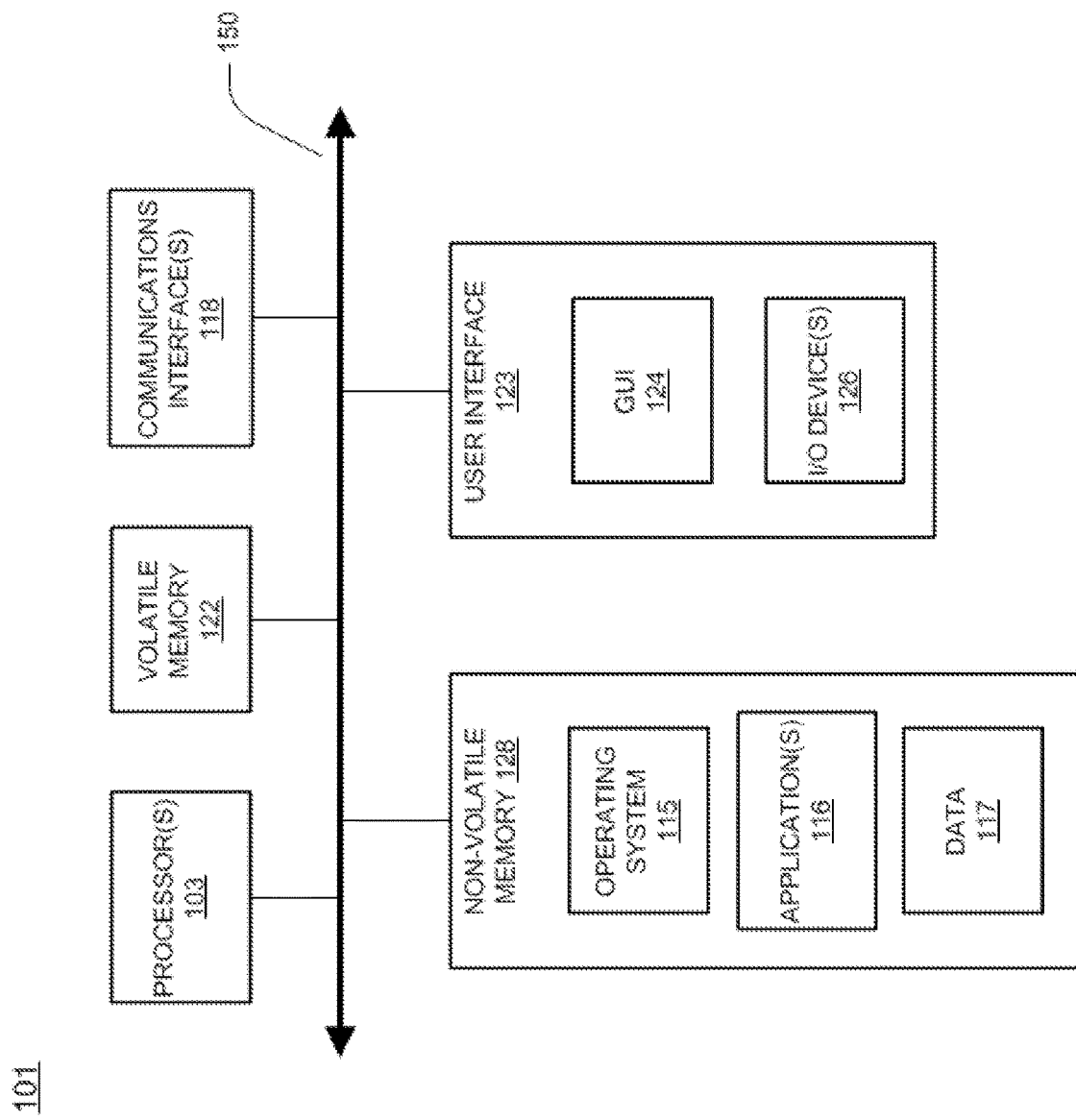
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
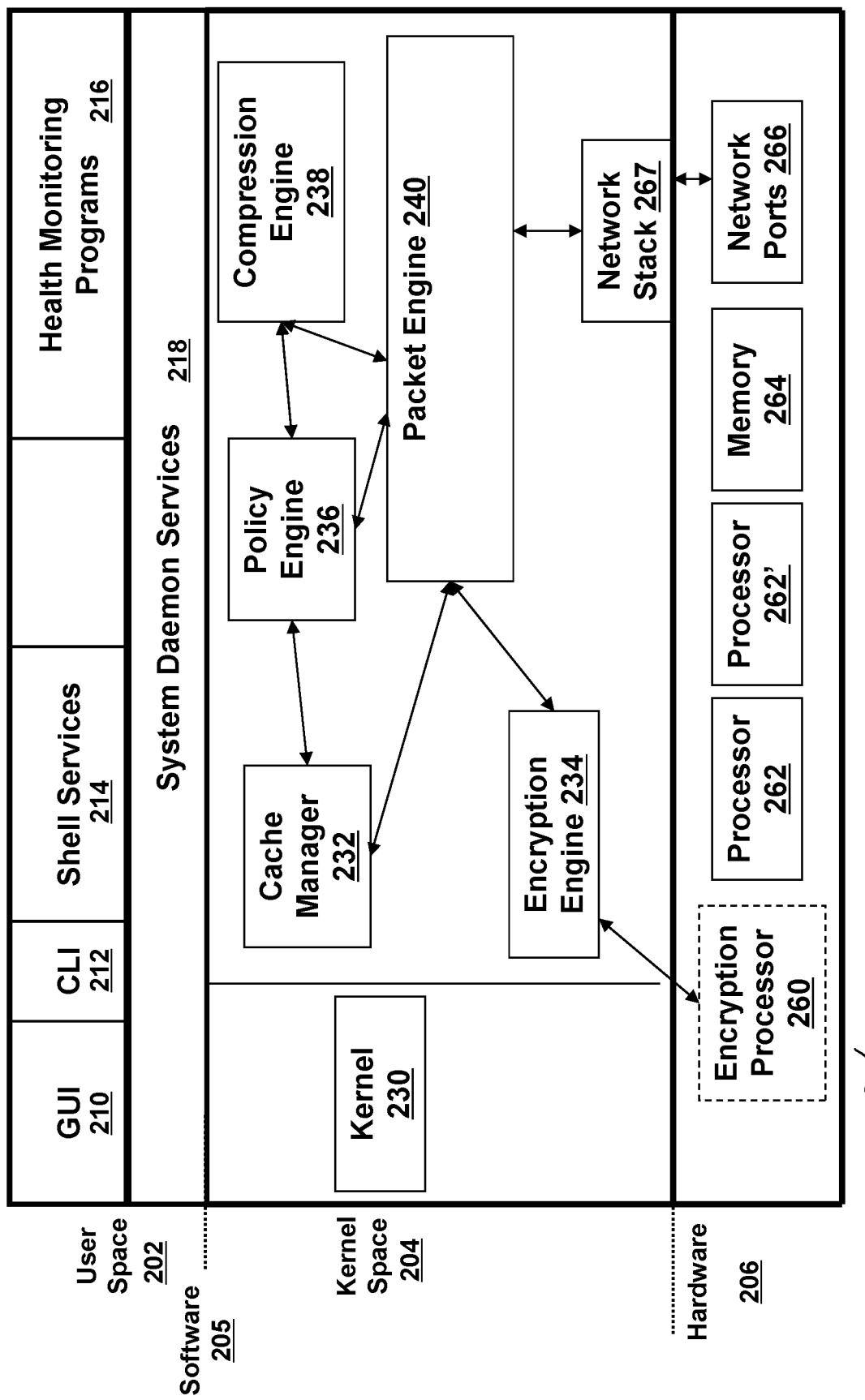
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Validating a Request to Establish a Connection

Figure 3:
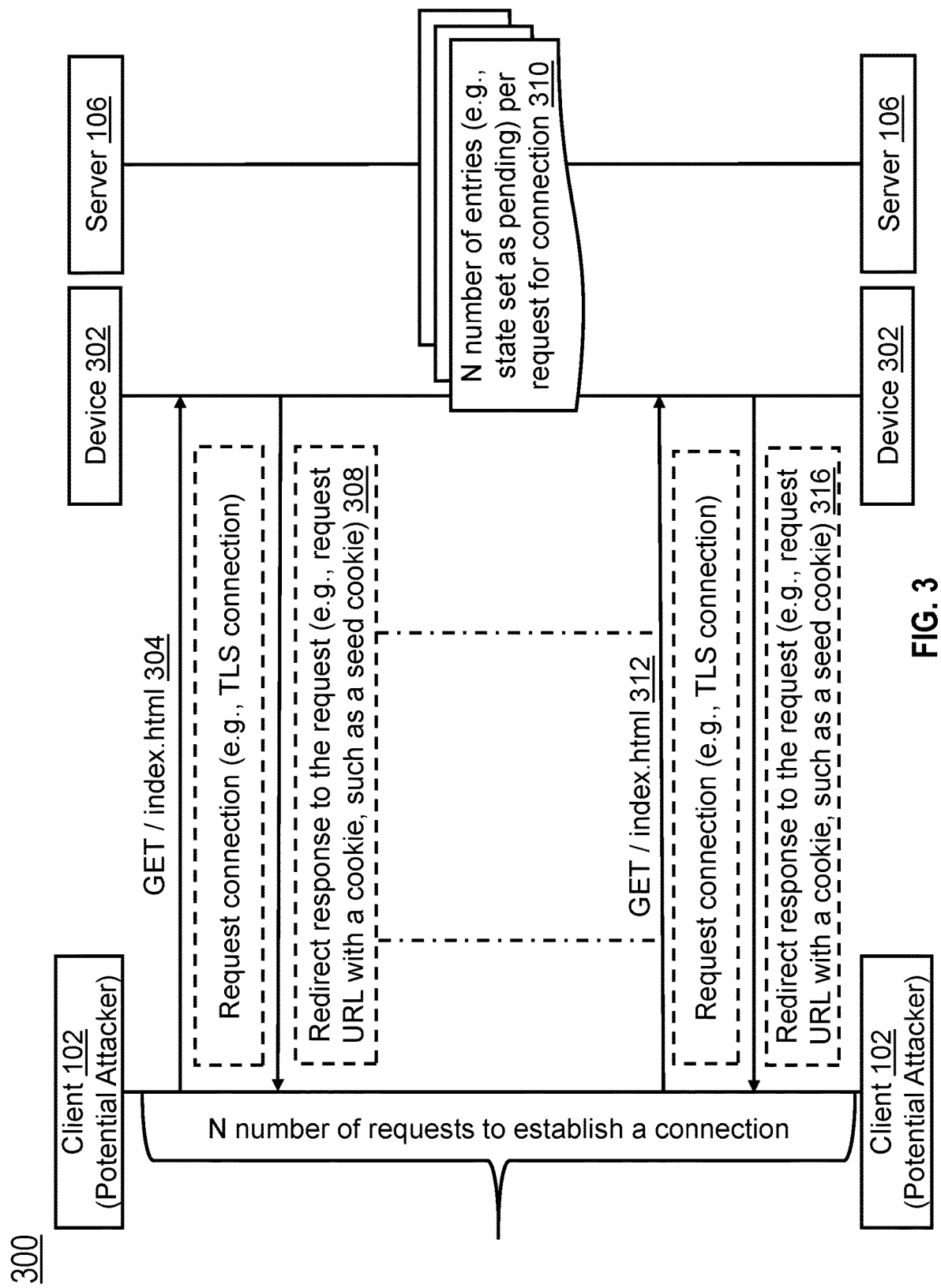
FIG. 3 is a communication diagram of a system for validating a request to establish a connection, in accordance with an illustrative embodiment.

Certain systems and/or methods may prevent unauthorized access to validation/authentication information by challenging/validating each received request to establish a connection. Referring to FIG. 3, depicted is a communication diagram of an embodiment of a process 300 for validating a request to establish a connection (e.g., to prevent unauthorized access to validation information). In accordance with process 300, a device 302 (e.g., a gateway module, a local/foreign node, and/or an application delivery controller (ADC)) intermediary between a client 102 and a server 106 (e.g., a backend server supporting hypertext transfer protocol (HTTP) and/or hypertext transfer protocol secure (HTTPS)) may receive/obtain a request (e.g., GET/index.html) from the client or potential attacker 102 (304 or 312). The request from the client or potential attacker 102 may include or correspond to a request to establish a connection (e.g., a TLS connection). To challenge/validate each request, the device 302 may generate/configure a randomized seed value, such as a seed cookie. Responsive to receiving the request and/or generating the randomized seed value, the device 302 may send/transmit/communicate a response to the client 102, wherein the response can include the randomized seed value (308 or 316). In certain embodiments, the device 302 and/or server 106 can maintain (e.g., store in memory or storage) and/or configure an entry for each un-validated request (e.g., configure N number of entries for N number of requests) to establish a connection (310). Furthermore, the device 302 can configure a state for each entry, wherein the state can be set/configured as pending.

In some embodiments, the client 102 may generate/create (e.g., via a JavaScript) a client validation cookie (e.g., a morphed/modified cookie) according to (or based on) the randomized seed value and/or an authentication token for the connection (e.g., a secret token). The authentication token can be generated/configured/determined/provided when a user session is created for a user/entity. Responsive to generating the client validation cookie and/or receiving the challenge (e.g., challenge to the request from the device 302), the client 102 may send/transmit/communicate the client validation cookie (e.g., send in a response) to the device 302.

Upon receiving/obtaining the client validation cookie, the device 302 may retrieve/obtain/recover/identify the configured entry corresponding to a particular un-validated request. The device 302 may then calculate/generate/configure/determine a client validation cookie to compare/match with the received client validation cookie (e.g., received from the client). Therefore, according to process 300, the device 302 can maintain the state of an entry (e.g., corresponding to an un-validated request) as pending until the corresponding request is validated/authenticated (310). As such, an attacker 102 can conduct/launch/execute an attack (e.g., a distributed denial of service (DDoS) attack) in which a plurality of un-validated requests (e.g., N number of requests) for a connection are sent/transmitted to the device 302 (312). Responsive to receiving the plurality of requests, the device 302 can attempt to validate each request (316), thereby consuming/exhausting the memory of the device 302 (e.g., by maintaining a pending entry for each un-validated request).

The present disclosure is directed towards systems and methods for validating/verifying/authenticating/confirming a request from a client 102 (e.g., a smartphone, a laptop, a tablet device, a desktop computer of a user, and/or a client supporting HTTP/HTTPS) to establish a connection, while preventing/mitigating attempts (e.g., attempts by an attacker) to hijack/acquire/access validation information (e.g., cookies). The system and methods may prevent/mitigate attempts to deplete/consume/exhaust the memory of a targeted device 302 by relying on a stateless property of a client validation cookie function (e.g., a morphed cookie validation function). For instance, the device 302 may determine whether a received request to establish a connection is validated/authorized/authenticated based on (or according to) a connection identifier of the connection (e.g., unique-id). For example, the device 302 may use the connection identifier to determine whether the connection associated with and/or specified by the connection identifier is included in a list of validated connections. If the connection is excluded from the list of validated connections, the device 302 may determine the request to establish a connection requires validation/authentication.

In some embodiments, the device 302 may challenge/validate each request to establish a connection (e.g., a secure connection and/or a non-secure connection) by generating/configuring a cookie (or other information) for validating the request. The device 302 may generate/configure/create the cookie according to the connection identifier and/or a shared counter (e.g., a global variable counter). Responsive to generating the cookie, the device 302 may send/transmit/provide/indicate/communicate the cookie to the client 102. The client 102 can then generate/configure a client validation cookie (e.g., a morphed/modified cookie) according to (or based on) the cookie (e.g., provided by the device) and/or an authentication token for the connection (e.g., a secret token). The authentication token can be generated/configured/determined/provided when a user session is created for a user/entity. Responsive to generating the client validation cookie, the client 102 may send/transmit/communicate the client validation cookie (e.g., send in a response) to the device 302. To validate the request to establish the connection, the device 302 may recalculate/generate/configure a candidate validation cookie, according to (or by using) a value of a counter range of the shared counter, that matches/corresponds to the received client validation cookie (e.g., generated by the client 102).

Figure 4:
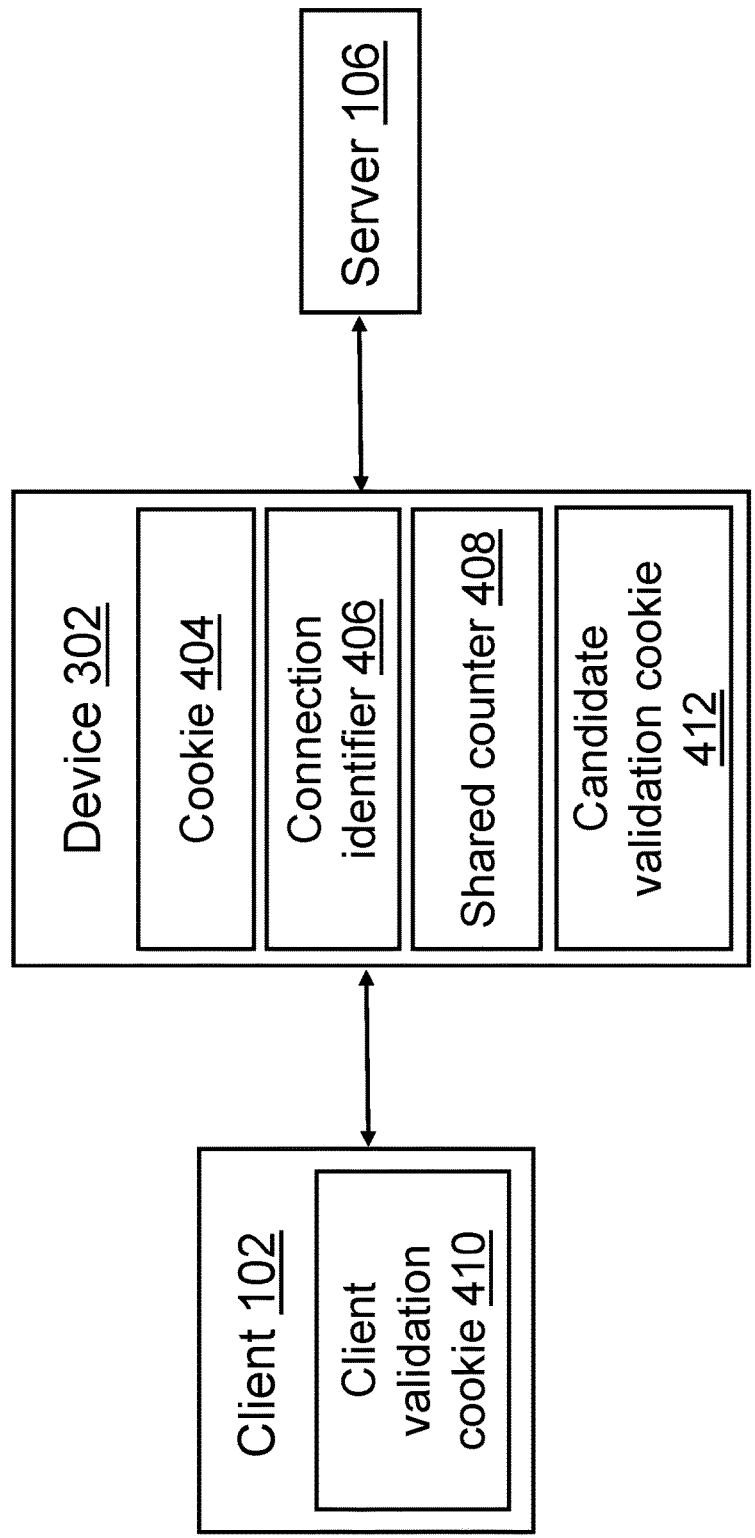
FIG. 4 is a block diagram of a system for validating a request to establish a connection, in accordance with an illustrative embodiment.

Referring to FIG. 4, depicted is a block diagram of one example embodiment of a system 400 for validating a request to establish/configure a connection, e.g., establish a connection for a user session. The system 400 may include one or more clients 102 of an entity, one or more devices 302, and/or one or more servers 106. The device 302 can include or maintain or have access to a cookie 404, a connection identifier 406, a shared counter 408 and/or a candidate validation cookie 412. The client 102 can include or maintain or have access to a client validation cookie 410.

Each of the above-mentioned elements or entities is implemented in hardware, or a combination of hardware and software, in one or more embodiments. Each component of the system 400 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 400 may include one or more servers 106. The server 106 (e.g., a backend server supporting HTTPS messages or transactions, and/or other servers 106) may be configured and/or designed to host one or more resources (e.g., one or more URLs) and/or services (e.g., application resources, as a web application, SaaS application or remote-hosted network application). The server 106 may be configured and/or designed to provision the one or more resources and/or services to one or more clients 102 of a consumer or other entity (e.g., an organization or user), via one or more networks 104. For example, the client 102 may establish one or more sessions or connections (e.g., secured or otherwise, such as a non-secure (plain TCP) connection) with the server(s) 106 to access a service/resource, such as an application resource. In another example, the server(s) 106 may receive/obtain a request (e.g., a HTTP request) from the client 102 (e.g., via a device 302) to establish a connection to access one or more resources and/or configure a user session. In some embodiments, the server(s) 106 can be part of a cloud or datacenter, for instance. The server(s) 106 may include any embodiment of volatile memory 122 or non-volatile memory 128 (discussed in FIG. 1C for example) which may store files, data and/or content of the service. The server(s) 106 may communicate with other various components of the system 400 in FIG. 4 via a communications interface 118 for instance. Hence, the server(s) 106 may be similar in some aspects to the computer 101 described with reference to FIG. 1C.

To provide a service/resource, the server(s) 106 may execute, provide, provision, and/or host one or more network application(s). In some embodiments, a service/resource may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP—based sessions and/or connections. SaaS applications and/or web applications may include for instance salesforce.com, SAP, Microsoft Office 365, Dropbox or Gmail service, Amazon web services, and so on.

The system 400 may include one or more clients 102. The client 102 may include or correspond to devices of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) and/or other resources at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource (e.g., salesforce.com, SAP, Microsoft Office 365) from a service/resource provider, via a corporate account for the service/resource for instance.

The client 102 may be configured and/or designed to access one or more application resource(s) over one or more networks. The client 102 may access one or more application resources(s) by sending/transmitting/communicating a request to establish a connection (e.g., a secure or non-secure TCP connection) to a device 302, wherein the connection may include or correspond to a connection for a user session. In some embodiments, the client 102 may interact with the server(s) 106 via a device 302 (e.g., a device 302 intermediary between the client 102 and the server(s) 106). For example, the client 102 may send a request (e.g., a request to establish a connection, and/or other requests) and/or message (e.g. a HTTP message and/or other messages) to the server(s) 106 via the device 302. Responsive to sending the request/message, the client 102 may receive/obtain a response from the device 302 (e.g., an ADC and/or other devices). In some embodiments, the client 102 may receive/obtain a cookie 404 (e.g., a seed cookie and/or other cookies/information) and/or other information from the device 302 via the response. For example, responsive to receiving a request, the device 302 may send/transmit a response to the client 102. The response may include a cookie 404 and/or other information. In some embodiments, the device 302 may generate/configure/create the cookie 404 according to (or by using) a connection identifier (e.g., a unique-id), a shared counter (e.g., global variable counter), and/or other information.

Responsive to receiving/obtaining the cookie 404, the client 102 may generate/configure a client validation cookie 410. The client validation cookie 410 can be used for validating/authenticating a request (e.g., sent by the client 102). For instance, the client 102 may generate the client validation cookie 410 to authenticate/validate a request to establish a connection (e.g., a connection for a user session). In some embodiments, the client 102 may generate the client validation cookie 410 (e.g., a morphed cookie) according to (or based on) the cookie 404 and/or an authentication token for the connection (e.g., a secret token from the ADC session). Responsive to generating the client validation cookie 410, the client 102 may send/transmit/communicate/provide the client validation cookie 410 (or other information) to the device 302 (e.g., via a response/message to the device 302). The client 102 may store/maintain the client validation cookie 410 in a cache of the client 102, a memory 264 of the client 102, and/or a physical memory having a faster access time than memory 264. The client validation cookie 410 may be located within, outside, or adjacent to the client 102.

The system 400 may include one or more devices 302 (sometimes referred to as appliance(s) 200, gateway(s) 200, node(s), and/or application delivery controllers). A device 302 may be configured and/or designed to serve as an intermediary between different elements of a computer and/or network environment, such as between client(s) 102, server(s) 106, network(s) 104, and/or other devices 302 (e.g., as discussed above in connection with FIG. 2). In some embodiments, the device 302 may receive/obtain a request or message (e.g., HTTP GET request and/or other requests) from a client 102 and/or user to establish a connection. Responsive to receiving the request, the device 302 may create/generate a cookie 404 (e.g., a seed cookie) and/or other information. The cookie 404 generated by the device 302 may be configured and/or designed to create/generate a client validation cookie 410 for validating a request to establish a connection. In some embodiments, the device 302 may generate a cookie 404 upon receiving an un-validated request to establish a connection (e.g., from a client 102). In certain embodiments, the device 302 may send/transmit/communicate provide the cookie 404 to the client 102. Responsive to sending the cookie 404, the device 302 may receive/obtain a response from the client 102 that includes the client validation cookie 410 (e.g., generated by the client 102)

In some embodiments, the device 302 can generate/configure the cookie 404 according to (or based on) a connection identifier 406 and/or a shared counter 408 (e.g., cookie=fs (connection identifier, shared counter)). The connection identifier 406 (e.g., unique-id) included in the device 302 may be configured and/or designed to identify a connection, such as a secure connection and/or a non-secure (plain TCP) connection. In some embodiments, the device 302 may generate/create the connection identifier 406 according to (or by using) a plurality of connection parameters. The plurality of connection parameters may comprise at least one of: a SSL session identifier (e.g., SSL sessionid), a shared unique identifier (e.g., GlobalSharedUniqueId), a client IP address (e.g., client-ip), a server IP address (e.g., server-ip), a port of the client (e.g., client-port), a port of the server (e.g., server-port), and/or a server sequence number (e.g., InitialServerSequenceNumber). In some embodiments, the device 302 may generate/configure/determine a connection identifier 406 (e.g., unique-id) for a secure connection according to (or by using) a SSL session identifier (e.g., SSL session-id) and/or a shared unique identifier (e.g., GlobalSharedUniqueId). In another example, the device 302 may generate/configure a connection identifier 406 (e.g., unique-id) for a non-secure connection according to (or by using) a shared unique identifier (e.g., GlobalSharedUniqueId), a client IP address (e.g., client-ip), a server IP address (e.g., server-ip), a port of the client (e.g., client-port), a port of the server (e.g., server-port), and/or a server sequence number (e.g., InitialServerSequenceNumber).

In some embodiments, the device 302 can include, among other elements, a shared counter 408. The shared counter 408 (e.g., global variable counter) included in the device 302 may be configured and/or designed to determine/configure/generate/calculate the cookie 404 and/or a candidate validation cookie 412. For instance, the device 302 may generate the cookie 404 according to (or by using) the connection identifier 406 and/or the shared counter 408. The shared counter 408 can be common/shared/accessible across a plurality of sessions. In some embodiments, the shared counter 408 may output a next value at predetermined time intervals. For instance, the shared counter 408 may increment sequentially at periodic time intervals. In some embodiments, a sliding window can be used (e.g., used by the device 302) to determine/identify a counter range of the shared counter 408. For instance, a shared counter 408 may comprise a plurality of values, including $x_1, x_2, x_3, \ldots, x_j, x_n$. According to (or based on) a sliding window, the device 302 may determine a counter range of the shared counter 408 comprises a subset of the plurality of values of the shared counter 408, such as $x_2, x_3, \ldots, x_j$. In some embodiments, the device 302 may generate/calculate a cookie 404 (e.g., a candidate cookie, such as a first candidate cookie) for each value from the counter range of the shared counter 408 (e.g., according to the connection identifier 406). For each cookie 404, the device 302 may generate a candidate validation cookie 412 (e.g., according to an authentication token for the connection and/or the cookie(s) 404).

In some embodiments, the device 302 can include, among other elements, a candidate validation cookie 412. The candidate validation cookie 412 included in the device 302 may be configured and/or designed to determine whether to validate/authenticate the request to establish a connection. For instance, the device 302 may generate/configure/determine the candidate validation cookie 412 according to (or by using) a value of the counter range of the shared counter 408. In some embodiments, the device 302 may generate the candidate validation cookie 412 according to (or based on) an authentication token for the connection and/or the cookie 404 (e.g., candidate validation cookie=$f_m$(cookie, authentication token)). The device 302 may provide/generate/configure the authentication token upon creating a session (e.g., a user session) for a user/entity. In certain embodiments, the authentication token may include or correspond to a secret token from an ADC session, such as a secret token specific to a session (e.g., a user session). In some embodiments, the device 302 may determine the candidate validation cookie 412 that matches (or corresponds to) the client validation cookie 410. For instance, the device 302 may generate one or more candidate validation cookies 412 according to the authentication token and/or one or more candidate cookies 404 (e.g., generated by using the connection identifier 406 and/or the counter range). If the device 302 generates the candidate validation cookie(s) 412, the device 302 may determine whether at least one of the candidate validation cookies 412 matches the client validation cookie 410. Responsive to at least one candidate validation cookie 412 matching the client validation cookie 410, the device 302 may validate/authenticate the request to establish the connection. Responsive to failing to determine at least one candidate validation cookie 412 matching the client validation cookie 410, the device 302 may send/transmit/communicate another cookie 404 to the client 102 in order to receive another client validation cookie 410 (e.g., from the client 102). Responsive to receiving another client validation cookie 410, the device 302 may determine another candidate validation cookie 412 that matches (or corresponds to) the another client validation cookie 410.

The device 302 may be located at various points or in various communication paths, for example between two networks 104, within a computing and/or network environment 100. In other embodiments, the device 302 may be located on a network 104. One or more devices 302 may communicate with one another and/or work in conjunction to, for example, accelerate, protect and/or secure network traffic between clients 102 and servers 106 and/or provide load balancing of servers 106 to process requests from clients 102. In some embodiments, the one or more devices 302 may act as a proxy or access server to provide access to the one or more servers 106, provide security and/or act as a firewall between the client 102 and the server 106, and/or provide a secure VPN connection from the client 102 to the server 106, such as a SSL VPN connection and/or provide encryption and decryption operations.

In some embodiments, the cookie 404, the connection identifier 406, the shared counter 408, and/or the candidate validation cookie 412 may be stored/maintained in a cache of the device 302, a memory 264 of the device 302, and/or a physical memory having a faster access time than memory 264. The cookie 404, the connection identifier 406, the shared counter 408, and/or the candidate validation cookie 412 may be located within, outside, or adjacent to the device 302.

Figure 5:
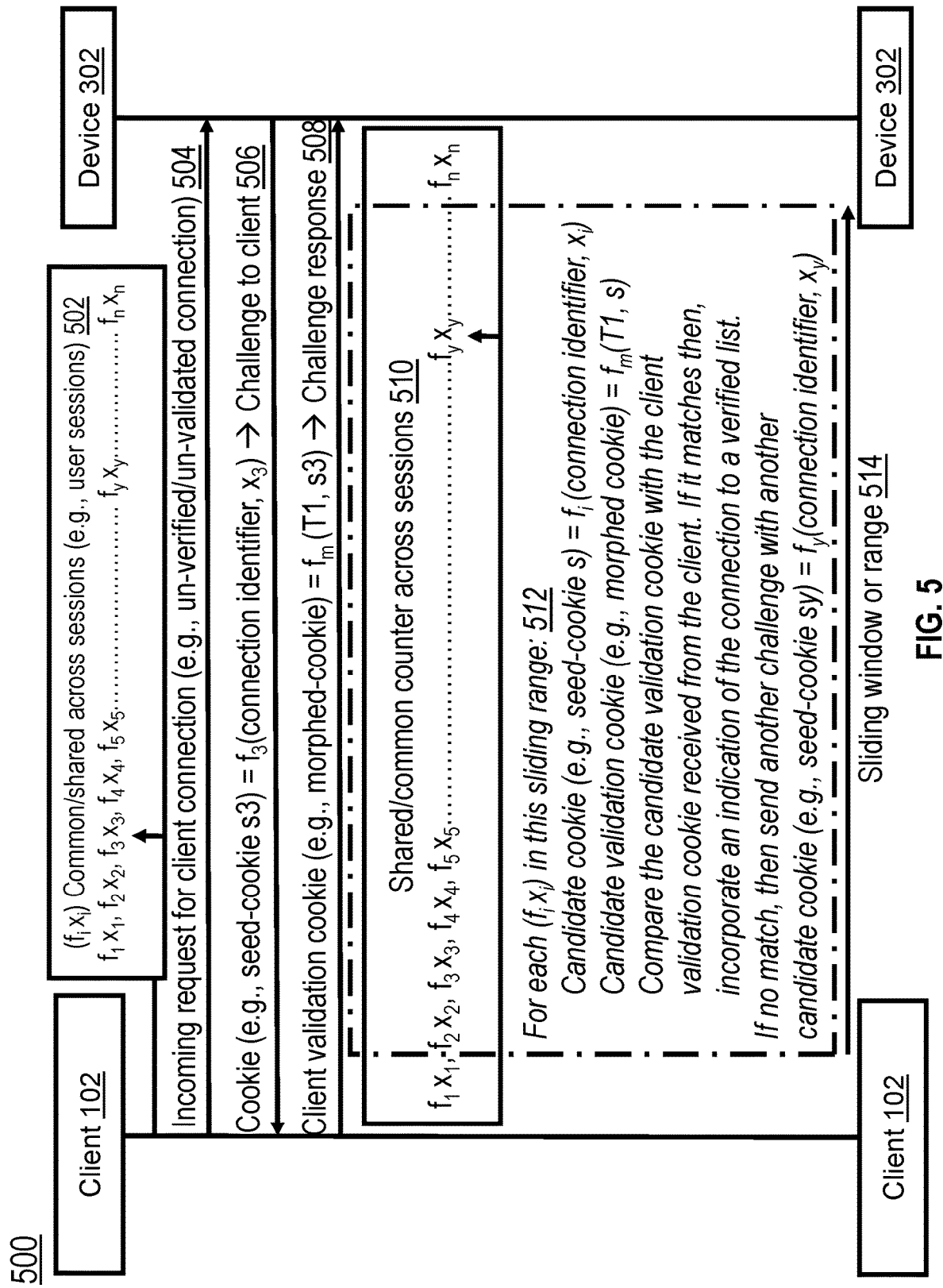
FIG. 5 is a communication diagram of a system for validating a request to establish a connection, in accordance with an illustrative embodiment.

Referring now to FIG. 5, depicted is a communication diagram of an embodiment of a process 500 for validating a request to establish a connection. In accordance with process 500, a plurality of functions (e.g., $f_1, f_2, f_3, \ldots, f_n$) and/or a plurality of values of a shared counter 408 (e.g., $x_1, x_2, x_3, \ldots, x_n$) can be accessed/shared/used by a device 302 across a plurality of sessions (502). Each function of the plurality of functions (e.g., $f_n$) may correspond to (or be associated with) a value of the plurality of values of the shared counter 408 (e.g., $x_n$). In certain embodiments, the client 102 (or potential attacker) may send/transmit/communicate a request (e.g., an un-verified request to establish a connection) to the device 302 (504). Responsive to receiving/obtaining the request, the device 302 may use a function (e.g., $f_3$), corresponding to a value of the shared counter 408 (e.g., $x_3$), to determine/configure/generate a cookie 404 (e.g., a seed-cookie). For instance, the device 302 may determine/generate a cookie 404 (e.g., seed-cookie s3) by using a function (e.g., $f_3$), a connection identifier 406 (e.g., unique-id), and/or a value of the shared counter 408 (e.g., $x_3$).

Once the device 302 determines/generates the cookie 404, the device 302 may send/transmit/provide a response to the client 102 that includes the cookie 404 (506). Responsive to receiving/obtaining the cookie 404, the client 102 may determine/generate/configure a client validation cookie 410 (e.g., morphed-cookie). For example, the client 102 can generate the client validation cookie 410 according to (or by using) the provided cookie 404 and/or an authentication token for the connection (e.g., T1). Responsive to generating the client validation cookie 410, the client 102 may communicate/send/provide the client validation cookie 410 (or other information) to the device 302 (508). The device 302 may receive the client validation cookie 410 from the client 102 and/or determine whether the client validation cookie 410 matches (or corresponds to) a candidate validation cookie 412 (e.g., generated by the device 302).

In some embodiments, the device 302 may determine/identify a counter range (e.g., $x_2, x_3, \ldots, x_y$) of the shared counter 408 (e.g., $x_1, x_2, x_3, \ldots, x_y, x_n$) and/or a subset of functions (e.g., $f_2, f_3, \ldots, f_y$) from the plurality of functions (e.g., $f_1, f_2, f_3, \ldots, f_y, f_n$) according to (or based on) a sliding window or range 514 (510). The counter range may comprise a plurality of values of the shared counter 408 identified (e.g., by the device 302) according to (or based on) the sliding window 514. For each function (e.g., $f_i$) in the subset of functions and/or value (e.g., (e.g., $x_i$) in the counter range, the device 302 may determine/generate a candidate cookie (512). For instance, the device 302 may generate the candidate cookie (e.g., seed-cookie s) according to (or based on) a function (e.g., $f_i$) from the subset of functions (e.g., determined according to the sliding window 514), a value (e.g., $x_i$) from the counter range (e.g., determined according to the sliding window 514), and/or a connection identifier 406.

Responsive to generating the candidate cookie 404, the device 302 may generate/configure a candidate validation cookie 412 (e.g., morphed-cookie). For example, the device 302 may generate the candidate validation cookie 412 according to (or by using) the candidate cookie 404 (e.g., seed-cookie s) and/or the authentication token (e.g., T1). The device 302 may compare the candidate validation cookie 412 with the client validation cookie 410 received from the client 102. If the device 302 determines the candidate validation cookie 412 matches (or corresponds to) the client validation cookie 410, the device 302 may validate/authenticate the request to establish a connection (e.g., sent by the client 102). For instance, the device 302 may incorporate an indication of the connection to a list of validated connections, responsive to the candidate validation cookie 412 matching the client validation cookie 410. If the device 302 determines the candidate validation cookie 412 fails to match the client validation cookie 410, the device 302 may send/transmit another request/challenge to the client 102 (e.g., request to establish a connection). The another request/challenge may include/provide/indicate another candidate cookie 404 (e.g., seed-cookie sy) to the client 102. The device 302 can generate the another candidate cookie 404 according to (or based on) the connection identifier 406, another value (e.g., $x_y$) from the counter range, and/or another function from the subset of functions (e.g., $f_y$).

Figure 6:
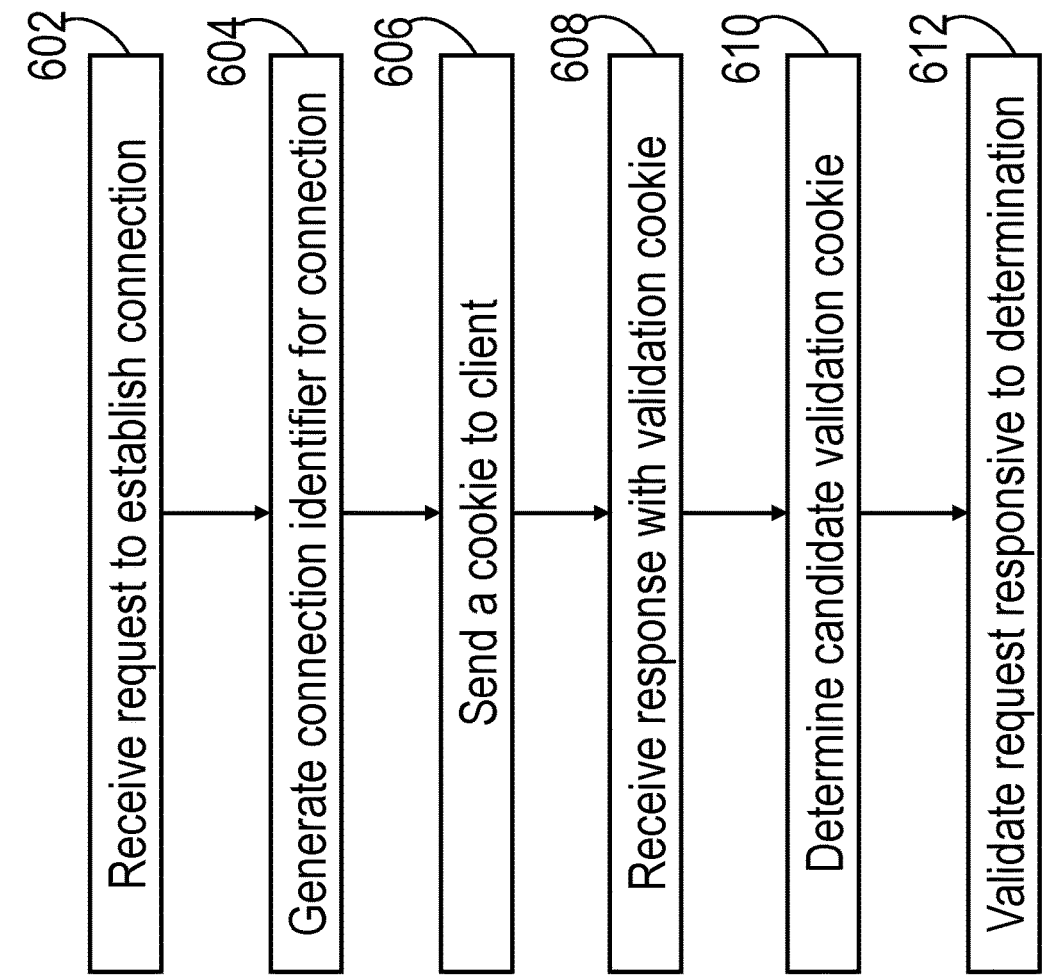
FIG. 6 is a flow diagram of an example method for validating a request to establish a connection, in accordance with an illustrative embodiment.

Referring to FIG. 6, depicted is a flow diagram of one embodiment of a method for validating a request to establish a connection. The functionalities of the method may be implemented using, or performed by, the components detailed herein in connection with FIGS. 1-5. In brief overview, a device 302 may receive a request to establish a connection from a client 102 (602). The device 302 may generate a connection identifier 406 for the connection (604). The device 302 may send a cookie 404 to the client 102 (606). The device 302 may receive a response that includes a client validation cookie 410 (608). The device 302 may determine a candidate validation cookie 412 (610). The device 302 may validate the request to establish the connections responsive to the determination (612).

Referring now to operation (602), and in some embodiments, a device 302 may receive/obtain a request from a client 102 to establish a connection (e.g., to establish a connection for a user session). The device 302 (e.g., an ADC and/or other devices) may be intermediary between the client 102 and a server 106. For example, an ADC intermediary between the client 102 and the server 106 may receive an HTTP request, such as GET/index.html. In operation (604), and in some embodiments, the device 302 may generate/create/configure a connection identifier 406 for the connection. For instance, responsive to receiving the request to establish the connection, the device 302 may generate/configure the connection identifier 406 (e.g., unique-id). The device 302 may generate the connection identifier 406 according to (or based on) a plurality of connection parameters. The plurality of connection parameters may comprise at least one of: a secure sockets layer (SSL) session identifier (e.g., SSL session-id), a shared unique identifier (e.g., GlobalSharedUniqueId), a client internet protocol (IP) address (e.g., client-ip), a server IP address (e.g., server-ip), a port of the client (e.g., client-port), a port of the server (e.g., server-port), and/or a server sequence number (e.g., Initial ServerSequenceNumber). In certain embodiments, the device 302 may determine whether the received request is validated/authorized according to (or based on) the connection identifier 406. For example, the device 302 may determine whether an indication of the connection is included in a list of validated connections according to (or by using) the connection identifier 406.

In some embodiments, the device 302 may determine/configure/generate a connection identifier 406 for secure and/or non-secure (e.g., plain TCP) connections. For instance, the device 302 may generate a connection identifier 406 (e.g., unique-id) for a secure connection according to (or based on) a SSL session identifier (e.g., SSL session-id) and/or a shared unique identifier (e.g., GlobalSharedUniqueId). The SSL session identifier may indicate/specify an identification (ID) to uniquely identify a secure connection. In certain embodiments, each new/novel SSL session may include or correspond to a new client connection. In some embodiments, the shared unique identifier may include or correspond to a global shared unique ID that is configured/propagated to a plurality of provisioned nodes. In another example, the device 302 may generate/configure a connection identifier 406 (e.g., unique-id) for a non-secure connection according to (or based on) a shared unique identifier (e.g., GlobalSharedUniqueId), a client IP address (e.g., client-ip), a server IP address (e.g., server-ip), a port of the client (e.g., client-port), a port of the server (e.g., server-port), and/or a server sequence number (e.g., InitialServerSequenceNumber). For instance, the shared unique identifier, the client IP address, the server IP address, the port of the client, the port of the server, and/or the server sequence number can be used to create/generate/determine/configure a unique hash value. In some embodiments, the device 302 may use a first function (e.g., function s) to generate the connection identifier 406 for the secure connection. The device 302 may generate the connection identifier 406 for the non-secure connection according to (or by using) a second function (e.g., function t). The first function and/or the second function can operate on the plurality of connection parameters to determine/configure/generate the connection identifier 406.

Referring now to operation (606), and in some embodiments, the device 302 may send/transmit/communicate/broadcast a cookie 404 to the client 102. The device 302 may generate/create/configure the cookie 404 according to (or based on) the connection identifier 406, a shared counter 408 (e.g., global variable counter), and/or other information. For instance, the device 302 may generate the cookie 404 (e.g., a seed cookie) by using a function (e.g., function fs) that operates on the connection identifier 406 and/or the shared counter 408 (e.g., seed cookie=fs (unique-id, global variable counter x)). In some embodiments, the shared counter 408 may output a next value at predetermined time intervals. For instance, the shared counter 408 may increment sequentially at periodic time intervals. The shared counter 408 can be common/shared/accessible across a plurality of sessions. In some embodiments, the client 102 may receive/obtain the cookie 404 from the device 302. Responsive to receiving the cookie 404, the client 102 may generate/configure/create a client validation cookie 410 (e.g., for validating/authenticating the request) according to (or by using) the cookie 404. For instance the client 102 may generate the client validation cookie 410 (e.g., morphed cookie) according to the received cookie 404, an authentication token (e.g., secret token) for the connection, and/or other information. The authentication token can be provided/generated/configured upon creating a session (e.g., a user session) for a user/entity. Referring now to operation (608), and in some embodiments, the device 302 may receive/obtain a response from the client 102. The response may include/provide/specify/indicate the client validation cookie 410 generated by the client 102 (e.g., according to the cookie 404 and/or the authentication token) and/or other information. For instance, if the client 102 generates the client validation cookie 410, the client 102 may send/transmit/provide the client validation cookie 410 to the device 302 via a response.

Referring now to operation (610), and in some embodiments, the device 302 may determine/generate/configure a candidate validation cookie 412 (e.g., a morphed cookies) that matches (or corresponds to) the client validation cookie 410. For instance, the device 302 may generate one or more candidate validation cookies 412 according to a value of a counter range of the shared counter 408 (e.g., $x_y$) and/or the connection identifier 406. Responsive to generating the candidate validation cookie(s) 412, the device 302 may determine the candidate validation cookie 412 that matches the client validation cookie 410. In some embodiments, the counter range of the shared counter 408 may comprise a plurality of values of the shared counter 408 (e.g., $x_2$, $x_3$, $x_4$, ..., $x_y$) identified/determined according to (or by using) a sliding window 514. For instance, the device 302 may use the sliding window 514 to determine the counter range of the shared counter 408.

In some embodiments, a first function (e.g., $f_2$) may correspond to (or be associated with) a first value (e.g., $x_2$) of the plurality of values of the shared counter 408 (e.g., $x_2$, $x_3$, $x_4$, ..., $x_y$). A second function (e.g., $f_3$) may correspond to a second value (e.g., $x_3$) of the plurality of values of the shared counter 408 (e.g., $x_2$, $x_3$, $x_4$, ..., $x_y$). In some embodiments, the device 302 may determine a first (or second) candidate cookie 404 using the first (or second) function. For instance, the first candidate cookie 404 and/or the second candidate cookie 404 (e.g., candidate seed cookie) may be determined/generated according to the first/second function, the connection identifier 406, and/or the first/second value of the shared counter 408 corresponding to the first/second function (e.g., candidate cookie=$f_y$(connection identifier, $x_y$)). In some embodiments, the device 302 may generate/calculate/determine a candidate validation cookie 412 that matches the client validation cookie 410 according to (or based on) the first candidate cookie 404 and/or the second candidate cookie 404. For instance, the device 302 may generate a candidate validation cookie 412 according to the authentication token and/or the first/second candidate cookie 404.

In some embodiments, determining a candidate validation cookie 412 that matches the client validation cookie 410 may comprise generating, by the device 302, a first candidate cookie 404 for a first value of the counter range. For instance, the device 302 may generate/configure/create a first candidate cookie 404 (e.g., seed cookie s2) according to (or by using) the connection identifier 406 (e.g., unique-id) and/or a first value (e.g., $x_2$) of the counter range (e.g., seed cookie s2=$f_2$(connection identifier, $x_2$)). Responsive to generating the first candidate cookie 404, the device 302 may generate/create/configure a first candidate validation cookie 412 (e.g., a first candidate morphed cookie). The device 302 may generate the first candidate validation cookie 412 according to (or by using) the authentication token (e.g., T1) and/or the first candidate cookie 404 (e.g., candidate validation cookie=$f_m$(T1, candidate cookie)). If the device 302 generates a first candidate validation cookie 412, the device 302 can determine whether the first candidate validation cookie 412 matches (or corresponds to) the client validation cookie 410.

In certain embodiments, the device 302 may determine that the generated first candidate validation cookie 412 matches the client validation cookie 410. Responsive to the first candidate validation cookie 412 matching the client validation cookie 410, the device 302 may add/incorporate an indication of the connection to a list of validated connections. As such, the device 302 may determine that the connection is a validated/authenticated connection. In some embodiments, the device 302 may determine that the first candidate validation cookie 412 fails to match the client validation cookie 410. Responsive to the first candidate validation cookie 412 failing to match the client validation cookie 410, the device 302 may generate/configure/create a second candidate cookie 404 (e.g., a second seed cookie s2). The second candidate cookie 404 can be generated for a second value (e.g., $x_3$) of the counter range (e.g., $x_2$, $x_3$, $x_4$, ..., $x_y$). For instance, the second candidate cookie 404 may be generated according to (or based on) the connection identifier 406 (e.g., unique-id) and/or the second value of the counter range (e.g., second candidate cookie=$f_3$ (connection identifier, $x_3$). In some embodiments, the device 302 may generate/configure a second candidate validation cookie 412 (e.g., a second morphed cookie) according to (or by using) the authentication token (e.g., T1) and/or the second candidate cookie 404 (e.g., second candidate validation cookie=$f_m$ (T1, second candidate cookie). Responsive to generating the second candidate validation cookie 412, the device 302 may determine that the second candidate validation cookie 412 matches (or corresponds to) the client validation cookie 410. Responsive to the second candidate validation cookie 412 matching the client validation cookie 410, the device 302 may add/incorporate an indication of the connection to a list of validated connections. As such, the device 302 may determine that the connection is a validated/authenticated connection.

In some embodiments, determining a candidate validation cookie 412 that matches the client validation cookie 410 may comprise generating/creating a plurality of candidate cookies. For instance, the device 302 may generate/configure a plurality of candidate cookies (e.g., a plurality of seed cookies) according to (or by using) a plurality of values of the counter range (e.g., all the values of the counter range). For example, the device 302 may generate the plurality of candidate cookies (e.g., seed cookie s2, seed cookie s3, . . . , seed cookie sy) by using the values of the counter range (e.g., $x_2$, $x_3$, $x_4$, . . . , $x_y$, identified according to the sliding window 514) and/or the connection identifier 406. Each candidate cookie 404 from the plurality of candidate cookies may be associated/related with a corresponding value of the counter range. As such, each candidate cookie 404 from the plurality of candidate cookies can be generated according to (or by using) the corresponding value of the counter range (and/or the connection identifier 406). Responsive to generating the plurality of candidate cookies, the device 302 may generate/configure a plurality of candidate validation cookies. The device 302 may generate the plurality of candidate validation cookies according to (or based on) the authentication token and/or the plurality of candidate cookies. Each candidate validation cookie 412 from the plurality of candidate validation cookies may be associated with a corresponding candidate cookie 404 from the plurality of candidate cookies. As such, each candidate validation cookie 412 can be generated according to the corresponding candidate cookie 404. In some embodiments, the device 302 may determine whether the plurality of candidate validation cookies includes the candidate validation cookie 412 that matches (or corresponds to) the client validation cookie 410.

In some embodiments, the device 302 may determine that the candidate validation cookie 412, from the plurality of candidate validation cookies, matches the client validation cookie 410. For instance, the device 302 may determine that at least one candidate validation cookie 412 from the plurality of candidate validation cookies matches the client validation cookie 410. Responsive to determining that the candidate validation cookie 412 (e.g., from the plurality of candidate validation cookies 412) matches the client validation cookie 410, the device 302 may incorporate/add an indication (e.g., an identifier) of the connection to a list of verified connections. As in operation (612), the device 302 may validate/confirm/authenticate the request responsive to the determination (e.g., determining a candidate validation cookie 412 that matches the client validation cookie 410). In some embodiments, the device 302 may determine that the plurality of candidate validation cookies excludes the candidate validation cookie 412 that matches (or corresponds to) the client validation cookie 410. Therefore, the device 302 may send/transmit/communicate another cookie 404 to the client 102 in order to receive another client validation cookie 410 (e.g., from the client 102). Responsive to receiving another client validation cookie 410, the device 302 may determine another candidate validation cookie 412 that matches (or corresponds to) the another client validation cookie 410.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
receiving, by a device that is intermediary between a client and a server, a request from the client to establish a connection;
sending, by the device to the client, a cookie, the cookie generated according to a connection identifier and a shared counter;
receiving, by the device, a response from the client that includes a client validation cookie for validating the request, the client validation cookie generated according to the cookie;
determining, by the device, a candidate validation cookie according to a value of a plurality of values of a counter range of the shared counter identified according to a sliding window, that matches the client validation cookie; and validating, by the device, the request responsive to the determination.

2. The method of claim 1, comprising:
generating, by the device, the connection identifier for the connection according to a plurality of connection parameters, the plurality of connection parameters comprising at least one of: a secure sockets layer (SSL) session identifier, a shared unique identifier, a client internet protocol (IP) address, a server IP address, a port of the client, a port of the server, or a server sequence number.

3. The method of claim 1, wherein the shared counter outputs a next value at predetermined time intervals.

4. The method of claim 1, comprising:
generating, by the device according to the connection identifier and the counter range, a first candidate cookie for a first value of the counter range;
generating, by the device, a first candidate validation cookie according to an authentication token for the connection and the first candidate cookie; and
determining, by the device, whether the first candidate validation cookie matches the client validation cookie.

5. The method of claim 4, comprising:
determining, by the device, that the first candidate validation cookie matches the client validation cookie; and
incorporating, by the device responsive to the first candidate validation cookie matching the client validation cookie, an indication of the connection to a list of validated connections.

6. The method of claim 4, comprising:
determining, by the device, that the first candidate validation cookie fails to match the client validation cookie;
generating, by the device responsive to the first candidate validation cookie failing to match the client validation cookie, a second candidate cookie for a second value of the counter range according to the connection identifier and the counter range;
generating, by the device, a second candidate validation cookie according to the authentication token and the second candidate cookie;
determining, by the device, that the second candidate validation cookie matches the client validation cookie; and
incorporating, by the device responsive to the second candidate validation cookie matching the client validation cookie, an indication of the connection to a list of validated connections.

7. The method of claim 1, comprising:
generating, by the device according to the connection identifier, a plurality of candidate cookies according to the plurality of values of the counter range;
generating, by the device, a plurality of candidate validation cookies according to an authentication token and the plurality of candidate cookies; and
determining, by the device, whether the plurality of candidate validation cookies includes the candidate validation cookie that matches the client validation cookie.

8. The method of claim 7, comprising:
determining, by the device, that the candidate validation cookie, from the plurality of candidate validation cookies, matches the client validation cookie.

9. The method of claim 1, wherein the counter range of the shared counter comprises the plurality of values of the shared counter identified according to a sliding window.

10. The method of claim 9, comprising:
determining, by the device, a first candidate cookie using a first function corresponding to a first value of the plurality of values of the shared counter; and
determining, by the device, a second candidate cookie using a second function corresponding to a second value of the plurality of values of the shared counter.

11. A device, comprising:
at least one processor coupled to memory and configured to:
receive a request from a client to establish a connection;
send a cookie, the cookie generated according to a connection identifier and a shared counter;
receive a response from the client that includes a client validation cookie for validating the request, the client validation cookie generated according to the cookie;
determine a candidate validation cookie according to a value of a plurality of values of a counter range of the shared counter identified according to a sliding window, that matches the client validation cookie; and
validate the request responsive to the determination.

12. The device of claim 11, wherein the at least one processor is configured to:
generate the connection identifier for the connection according to a plurality of connection parameters, the plurality of connection parameters comprising at least one of: a secure sockets layer (SSL) session identifier, a shared unique identifier, a client internet protocol (IP) address, a server IP address, a port of the client, a port of a server, or a server sequence number.

13. The device of claim 11, wherein the at least one processor is configured to:
generate, according to the connection identifier and the counter range, a first candidate cookie for a first value of the counter range;
generate a first candidate validation cookie according to an authentication token for the connection and the first candidate cookie; and
determine whether the first candidate validation cookie matches the client validation cookie.

14. The device of claim 13, wherein the at least one processor is configured to:
determine that the first candidate validation cookie matches the client validation cookie; and
incorporate, responsive to the first candidate validation cookie matching the client validation cookie, an indication of the connection to a list of validated connections.

15. The device of claim 13, wherein the at least one processor is configured to:
determine that the first candidate validation cookie fails to match the client validation cookie;
generate, responsive to the first candidate validation cookie failing to match the client validation cookie, a second candidate cookie for a second value of the counter range according to the connection identifier and the counter range;
generate a second candidate validation cookie according to the authentication token and the second candidate cookie;
determine that the second candidate validation cookie matches the client validation cookie; and
incorporate, responsive to the second candidate validation cookie matching the client validation cookie, an indication of the connection to a list of validated connections.

16. The device of claim 11, wherein the at least one processor is configured to:
  generate, according to the connection identifier, a plurality of candidate cookies according to the plurality of values of the counter range;
  generate a plurality of candidate validation cookies according to an authentication token and the plurality of candidate cookies; and
  determine whether the plurality of candidate validation cookies includes the candidate validation cookie that matches the client validation cookie.

17. The device of claim 16, wherein the at least one processor is configured to:
  determine that the candidate validation cookie, from the plurality of candidate validation cookies, matches the client validation cookie.

18. The device of claim 11, wherein the at least one processor is configured to:
  determine a first candidate cookie using a first function corresponding to a first value of the plurality of values of the shared counter; and
  determine a second candidate cookie using a second function corresponding to a second value of the plurality of values of the shared counter,
  wherein the counter range of the shared counter comprises the plurality of values of the shared counter identified according to a sliding window.

19. A non-transitory computer readable medium storing program instructions for causing at least one processor of a device to:
  receive a request from a client to establish a connection;
  send a cookie, the cookie generated according to a connection identifier and a shared counter;
  receive a response from the client that includes a client validation cookie for validating the request, the client validation cookie generated according to the cookie;
  determine a candidate validation cookie according to a value of a plurality of values of a counter range of the shared counter identified according to a sliding window, that matches the client validation cookie; and
  validate the request responsive to the determination.

20. The non-transitory computer readable medium of claim 19, wherein the program instructions cause the at least one processor to:
  generate, according to the connection identifier, a plurality of candidate cookies according to the plurality of values of the counter range;
  generate a plurality of candidate validation cookies according to an authentication token and the plurality of candidate cookies; and
  determine whether the plurality of candidate validation cookies includes the candidate validation cookie that matches the client validation cookie.

\* \* \* \* \*